(12) United States Patent
Bard

(10) Patent No.: US 8,515,095 B2
(45) Date of Patent: *Aug. 20, 2013

(54) REDUCING ANNOYANCE BY MANAGING THE ACOUSTIC NOISE PRODUCED BY A DEVICE

(75) Inventor: Benjamin A. Bard, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1137 days.

This patent is subject to a terminal disclaimer.

(21) Appl. No.: 11/867,593

(22) Filed: Oct. 4, 2007

(65) Prior Publication Data

US 2009/0092261 A1    Apr. 9, 2009

(51) Int. Cl.
 *H03B 29/00*   (2006.01)
(52) U.S. Cl.
 USPC ........................................................ 381/94.1
(58) Field of Classification Search
 USPC .................. 381/71.3, 71.1, 71.5, 56, 57, 94.1
 See application file for complete search history.

(56) References Cited

U.S. PATENT DOCUMENTS

| | | | |
|---|---|---|---|
| 6,591,198 B1 * | 7/2003 | Pratt | 702/35 |
| 7,139,401 B2 * | 11/2006 | Culman et al. | 381/71.7 |
| 7,224,810 B2 | 5/2007 | Brown | |
| 7,693,292 B1 | 4/2010 | Gross et al. | |
| 2003/0123675 A1 | 7/2003 | Culman et al. | |
| 2004/0009074 A1 | 1/2004 | Dodson, III | |
| 2004/0120113 A1 * | 6/2004 | Rapaich | 361/687 |
| 2005/0094823 A1 * | 5/2005 | Kobori et al. | 381/71.5 |
| 2009/0092261 A1 | 4/2009 | Bard | |

* cited by examiner

*Primary Examiner* — Mohammad Islam
*Assistant Examiner* — David Ton
(74) *Attorney, Agent, or Firm* — Blakely, Sokoloff, Taylor & Zafman LLP

(57) ABSTRACT

One embodiment of the present invention provides a system that reduces annoyance by managing the acoustic noise produced by a device. During operation, the system receives a set of acoustic characteristics for noise-producing components within the device. The system then uses these acoustic characteristics to estimate the acoustic noise being generated by each of these noise-producing components. Next, the system aggregates this set of acoustic noise estimates to produce an aggregate estimate for the acoustic noise produced by the device. The system then analyzes this aggregate estimate using an acoustic annoyance model to determine the acoustic annoyance level. The system then adjusts a setting in the device to manage the acoustic annoyance level produced by the device.

23 Claims, 8 Drawing Sheets

REDUCING ANNOYANCE BY MANAGING THE ACOUSTIC NOISE PRODUCED BY A DEVICE

RELATED APPLICATION

This application is related to the subject matter in a co-pending non-provisional application by inventors Paul J. Costa, David R. Cox, and Benjamin A. Bard entitled, "Managing Acoustic Noise Produced by a Device," having Ser. No. 11/867,622, and filing date 4 Oct. 2007.

BACKGROUND

1. Field of the Invention

The present invention relates to techniques for adjusting the acoustic noise produced by an electronic device, such as a computer system.

2. Related Art

Electronic devices, such as computers and mobile telephones, are increasingly being used for both business and entertainment purposes. However, as these devices are used in a wider range of environments, acoustic noise produced by these devices becomes more likely to disturb both device users as well as nearby people. For instance, acoustic noise produced by storage devices, power supplies, and/or thermal-cooling components within these electronic devices may collectively produce undesirable acoustic noise. Unfortunately, reducing such unwanted acoustic noise can be difficult and expensive, because such noise-producing components are typically essential components in such devices.

Hence, what is needed is a method and an apparatus that facilitates using electronic devices without the above-described problems.

SUMMARY

One embodiment of the present invention provides a system that reduces annoyance by managing the acoustic noise produced by a device. During operation, the system receives a set of acoustic characteristics for noise-producing components within the device. The system then uses these acoustic characteristics to estimate the acoustic noise being generated by each of these noise-producing components. Next, the system aggregates this set of acoustic noise estimates to produce an aggregate estimate for the acoustic noise produced by the device. The system then analyzes this aggregate estimate using an acoustic annoyance model to determine the acoustic annoyance level. The system then adjusts a setting in the device to manage the acoustic annoyance level produced by the device.

In some embodiments, the system estimates, judges, and adjusts the acoustic noise produced by the device to reduce user annoyance caused by the acoustic noise.

In some embodiments, the set of acoustic characteristics can include one or more of the following:
  a set of frequency spectra measurements for the acoustic noise produced by a noise-producing component in the device;
  a set of weighted frequency spectra measurements for the acoustic noise produced by a noise-producing component in the device;
  a set of averaged frequency spectra measurements for the acoustic noise produced by a noise-producing component in the device;
  an analytical model that describes the acoustic noise produced by a noise-producing component in the device;
  a curve-fit model that describes the acoustic noise produced by a noise-producing component in the device;
  a sound-quality metric that describes a type and/or a level of acoustic noise; and/or
  a user-defined sound-quality metric.

In some embodiments, the system produces the aggregate estimate of the acoustic noise by aggregating acoustic characteristics associated with one or more noise-producing components. For instance, the system may aggregate one or more frequency spectra measurements, models, and/or sound-quality values.

In some embodiments, the acoustic annoyance model specifies an acoustic annoyance level associated with an undesirable sound quality and/or sound level for the acoustic noise produced by the device. Undesirable sound qualities and/or sound levels can include: steady-state acoustic noise levels; short-term and/or long-term oscillations of acoustic noise levels; steady-state sound qualities; and/or changes in a sound quality.

In some embodiments, the system identifies and characterizes the noise-producing components in the device. For instance, the system can calculate an estimated acoustic-noise profile for each noise-producing component. Note that by characterizing each noise-producing component in a realistic operating environment, the system can generate an accurate estimate of acoustic noise output.

In some embodiments, noise-producing components can include one or more of the following: a hard drive; an optical drive; a fan, blower, pump, or other cooling device; a capacitor; an inductor; an inverter (such as a power and/or a video inverter); and a transformer (e.g., a power adapter).

In some embodiments, the system checks the aggregate estimate of the acoustic noise produced by the device before, during, and/or after adjusting a setting. For instance, the system may estimate the effects of adjusting a setting, and compensate when making the adjustment to ensure that the adjustment does not increase the estimated acoustic noise beyond the given acoustic annoyance level.

In some embodiments, the system tracks a parameter for the device during device operation. The system then uses knowledge of this parameter to determine how to adjust the setting for a component. For instance, the system may track a parameter that indicates whether an optical drive in the device is actively spinning or not in use, to determine whether the noise generated by the optical drive can mask acoustic changes caused by adjusting the setting.

In some embodiments, an acoustic annoyance model can incorporate one or more of the following: the hearing ability of a user; the noise sensitivity of a user; a general acoustic expectation of a user; a specific acoustic expectation of a user; a level of activity for a device; and/or an environmental factor such as an ambient temperature or an ambient noise level.

In some embodiments, the system performs a calibration operation to receive a set of input from a user and/or to the environment the device is presently in. The system then calibrates the acoustic annoyance model based on the received input.

Table 1 illustrates exemplary acoustic transfer functions for a set of noise-producing components in accordance with an embodiment of the present invention.

Table 2 illustrates an exemplary acoustic state matrix for a device in accordance with an embodiment of the present invention.

Table 3 illustrates a rule-of-thumb for aggregating a set of individual sound pressure levels in accordance with an embodiment of the present invention.

Table 4 illustrates an exemplary aggregation method table for a device in accordance with an embodiment of the present invention.

Table 5 illustrates a set of exemplary psychoacoustic criteria and transition rules for a device in accordance with an embodiment of the present invention.

Table 6 illustrates a simple acoustic-annoyance minimization strategy for an open-loop thermal control system in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Existing Thermal and Acoustic Design Techniques

Many electronic devices include active cooling elements that dissipate heat generated during operation to avoid component damage. For instance, electronic devices are often equipped with cooling fans or pumps that remove heat from hot components. The set of cooling components included in a device is sometimes determined based on the amount of power expected to be consumed and/or dissipated by the device. During device operation, the difference between the maximum cooling capacity and the present heat level is called the "thermal margin" for the device. A thermal control system is typically included in devices to monitor such thermal data and to actively maintain a thermal margin for device components.

Figure 1:
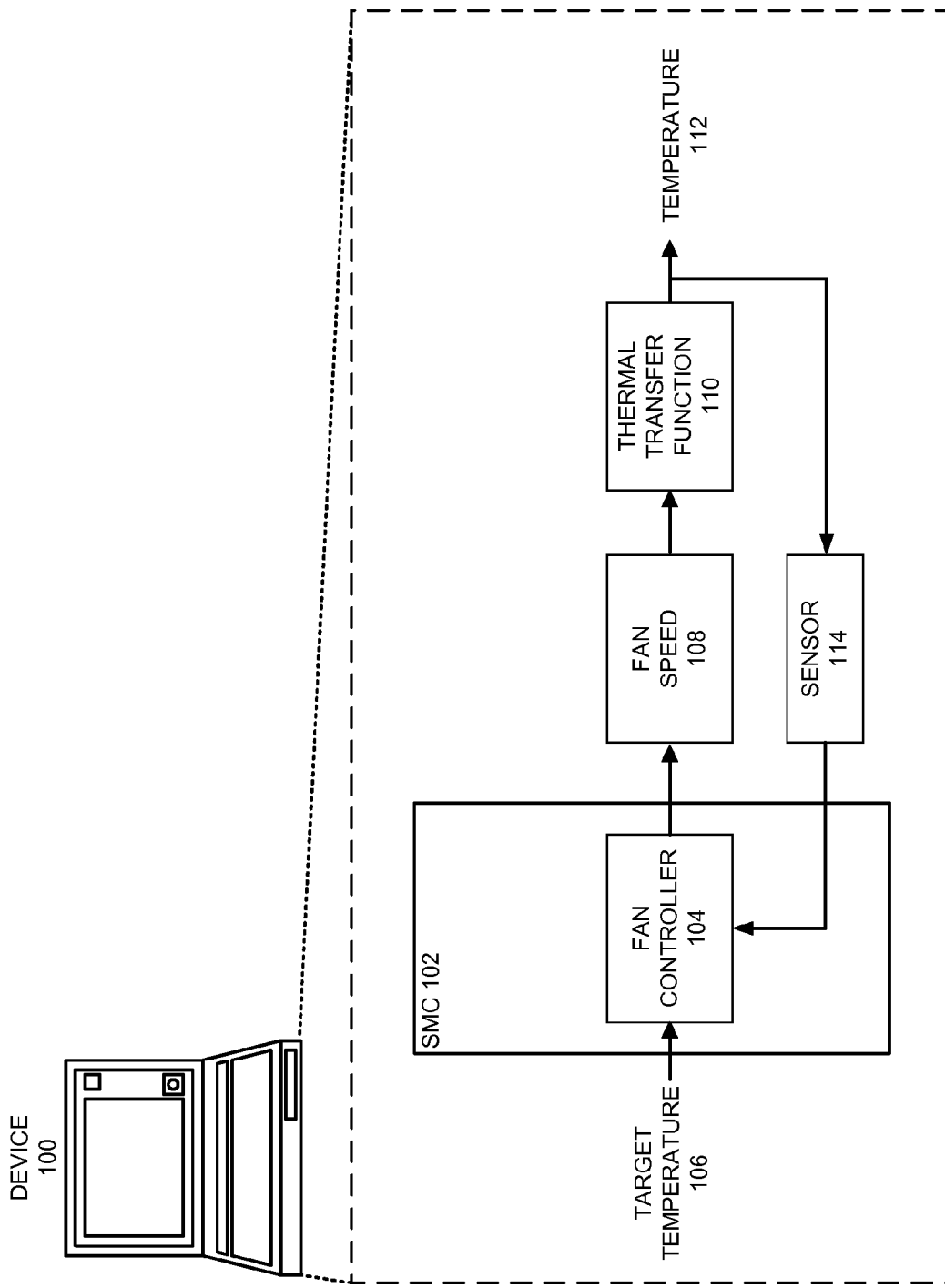
FIG. 1 illustrates the high-level operation of a thermal controller in a device in accordance with an embodiment of the present invention.

FIG. 1 illustrates the high-level operation of a thermal controller included as part of a system management controller (SMC) 102 for device 100. Fan controller 104 in SMC 102 receives a target temperature 106, along with a reading of the present temperature 112 from sensor 114. Based on the received values, fan controller 104 adjusts a device fan speed 108 to create airflow through a device enclosure (not shown). Thermal transfer function 110 is a representation of how the enclosure converts airflow and power usage into component temperatures. The present measured temperature 112 is monitored by sensor 114 and fed back to the fan controller 104.

Thermal control and acoustic performance are often pursued through two separate but overlapping efforts during the process of designing a device. From a thermal-centric viewpoint, designers often specify that a control system primarily ensures that all components are sufficiently cooled, and then, if no additional cooling is needed, fans and/or cooling devices can be slowed down to reduce associated noise. This design process follows the logic that exceeding thermal limits can be detrimental to continued device operation, while acoustic noise may be annoying but is typically non-destructive. Hence, thermal control systems are typically designed to guarantee thermal regulation across various performance states while minimizing fan speed as a secondary goal.

In parallel to thermal design, acoustical engineers separately measure noise levels over various performance and ambient temperature states to compare the acoustic noise output against an acoustic specification. For instance, depending on the desired acoustic goal(s) for a device, acoustical engineers may determine an acoustic margin as the difference between typical measured noise levels and a specified maximum noise level. Acoustical engineers typically perform noise checks on a number of sample devices to determine if the sample devices meet the acoustic specification. For instance, fan speed information may be logged in various steady-state conditions to measure corresponding sound levels. Note that such a sampling approach can have a number of disadvantages. Disadvantages include:

- the sample size of the analyzed units is small and sometimes does not match the full range of potential system configurations;
- an analysis of fan noise based on fan speeds logged during steady-state conditions may only monitor the steady-state performance of the acoustics, thereby missing transient effects; and
- a thermal-centric control system (shown in FIG. 1) may include sufficient infrastructure to allow thermal outliers to be identified for further analysis during testing, but not include any way to automate monitoring acoustic performance during production and build testing.

Note that acoustical engineers typically also analyze and account for noise from sources that are unrelated to thermal and/or power variables and are not constrained to a thermal-centric model that only considers noise outputs and effects resulting from thermal changes.

Because some of the acoustic noise produced by a device may be directly related to the device's cooling requirements, which are in turn related to the device's power usage and performance, guaranteeing that a design meets thermal, acoustic, and performance specifications can be challenging. Some thermal-centric noise management efforts attempt to indirectly control acoustic noise related to the thermal system via the thermal control system, but this is often difficult and inefficient. System designers may be able to reduce acoustic noise as a bi-product of optimizing a device's thermal control system and via careful component selection, but this task is complicated by the frequent need to select device components early in the design process, before a highly accurate acoustic test bed is available. Hence, the need to ensure that the device will comply with the thermal and acoustic specifications can lead to selecting components with low power demands that ensure large thermal and acoustic margins, but at the price of sacrificing performance. Such issues have become increasingly problematic due to ongoing demand for increased device performance and a corresponding decrease in thermal and acoustic margins.

In the above-described thermal-centric development model, the thermal control system does not have sufficient data to determine real-time acoustic performance to ensure compliance with acoustic specifications. In one embodiment of the present invention, a system calculates the sound levels of the noise-producing components in a device to provide real-time verification of an acoustic specification. The ability to estimate the acoustic noise produced by a device in real time facilitates dynamic acoustic control, thereby allowing designers to include higher-power (and hence higher-performance) components without degrading the user's acoustical experience.

Real-Time Acoustic Monitoring

"Noise" is often defined as unwanted sound generated by system components, in contrast to intentional audio output produced by a sound-producing audio component (such as a speaker). More specifically, "acoustic noise" is typically defined as unwanted sound radiated from components as a by-product of system operation. Another form of noise, "audio noise," is generally defined to be unwanted sound generated from audio components (e.g., static noise or interference-based noises produced by a speaker).

In one embodiment of the present invention, a system monitors the acoustic noise produced by a device during operation. For instance, the system may identify a set of acoustic noise sources in the device that have a significant effect on the total acoustic noise produced by the device. The system can use characterization data for each noise source to calculate and combine the acoustic noise produced by the individual noise sources, and can thereby produce a set of real-time estimates of the device's total acoustic noise output. Such noise sources often include motor-driven moving parts, such as fans and disk drives, as well as a range of other sound-producing components. For instance, noise-producing components can include: a hard drive; an optical drive; a fan, blower, pump, or other cooling device; a capacitor; an inverter (such as a power and/or a video inverter); or a transformer (e.g., a power adapter). Note that characterizations of such components may incorporate both constant as well as variable values that depend on different modes of device operation.

In one embodiment of the present invention, the system receives a set of characterization data for the noise-producing components in the device. For instance, acoustical engineers may determine an acoustic transfer function for each noise source that captures how the sound level produced by the noise source changes over various operating modes. For example, for a fan, the acoustic transfer function may determine the acoustic noise produced based on the revolutions per minute (rpm) of the fan. Such characterization data may be formulated by measuring a representative set of components in an environment that is operationally similar to the environment expected in the device, thereby generating an accurate acoustic noise model that also accounts for component variation.

Table 1 illustrates exemplary acoustic transfer functions for a set of noise-producing components. The characterization functions shown in Table 1 use system control parameters (such as fan rpm x) to determine sound pressure level estimates. In this example, these acoustic transfer functions provide a sound-pressure level (measured in decibels (dB)) for each individual noise-producing component in the device. These individual dB values can be combined to determine a combined total sound-pressure level for all of the noise-producing components of the device, dBATotal.

Acoustic transfer function equations may be derived in a number of ways. For instance, one technique for determining an acoustic transfer function is to fit a set of data points that describe a number of different component states to a curve. In another example, the hard drive motor illustrated in Table 1 is considered to be constant, because a hard drive typically spins its platters at a fixed speed when active. However, note that a more-detailed acoustic transfer function for the hard drive may take into account whether the drive platters are currently spinning or temporarily at rest, or can include the acoustic noise produced by movement of the disk arm during disk activity.

TABLE 1

| Component | Acoustic Transfer Function Equations | Output Key |
|---|---|---|
| Fan #1 | $-1E - 06x^2 + 0.0152x - 0.588$ | dBA0 |
| Fan #2 | $+1E - 07x^2 + 0.0112x - 4.6852$ | dBA1 |
| Hard Drive | 17.5 | dBA2 |
| Optical Drive | 24.3 | dBA3 |
| System Total | dB sum(dBA0, dBA1, dBA2, dBA3) | dBATotal |

Note that the system control parameters in the acoustic transfer functions may often be readily available to the acoustic control system. For instance, specific fan speed information may already be monitored and/or controlled by a device's thermal control system. In this case, an acoustic control system might be tightly coupled to the thermal control system, to facilitate accessing such data and thereby avoiding additional sensing circuitry.

Figure 2:
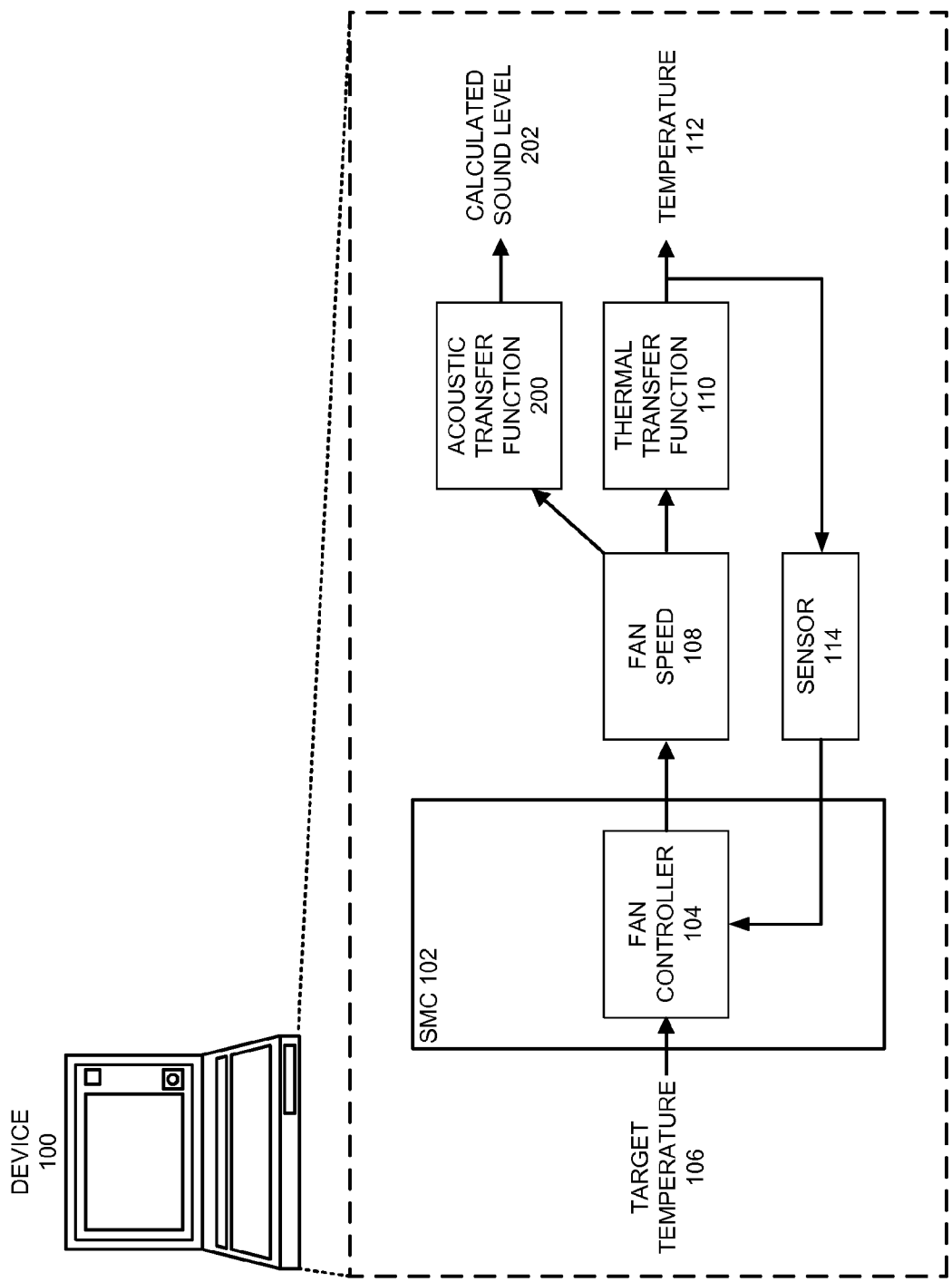
FIG. 2 illustrates the high-level operation of a device with a thermal controller and an added acoustic transfer function in accordance with an embodiment of the present invention.

FIG. 2 illustrates the high-level operation of a device with a thermal controller and added acoustic transfer function 200. During operation, the device's acoustic transfer function 200 uses fan speed 108 to estimate a calculated sound level 202 that is currently being produced by the device.

Note that characterizations derived from a representative component sample do not facilitate detecting acoustic anomalies in specific installed components, such as a fan failure or an acoustic noise generated by a broken fan blade rubbing against its plastic enclosure. Such specific component anomalies typically cannot be detected using general characterizations that describe a large set of components, but instead would need to be detected using direct feedback mechanisms in each individual device. However, the general characterizations can be used to generate an estimate of acoustic noise for components.

Real-Time Acoustic Control

In one embodiment of the present invention, the system strives to manage the acoustic noise produced by a device during operation. For instance, the system may track the acoustic noise level produced over time to ensure that this acoustic noise level stays below a specified threshold (or target) sound level defined for one or more different device states. Note that the specified sound level may be specified in a variety of ways, for example as a low target sound level that the system strives to achieve and/or maintain, or as a sound level limit that the system strives not to exceed. The target sound level and acoustic control system may also be associated with a non-linear function that increases the importance of reducing acoustic noise produced by the device as the difference between the acoustic noise produced and the specified target sound level increases.

Figure 3:
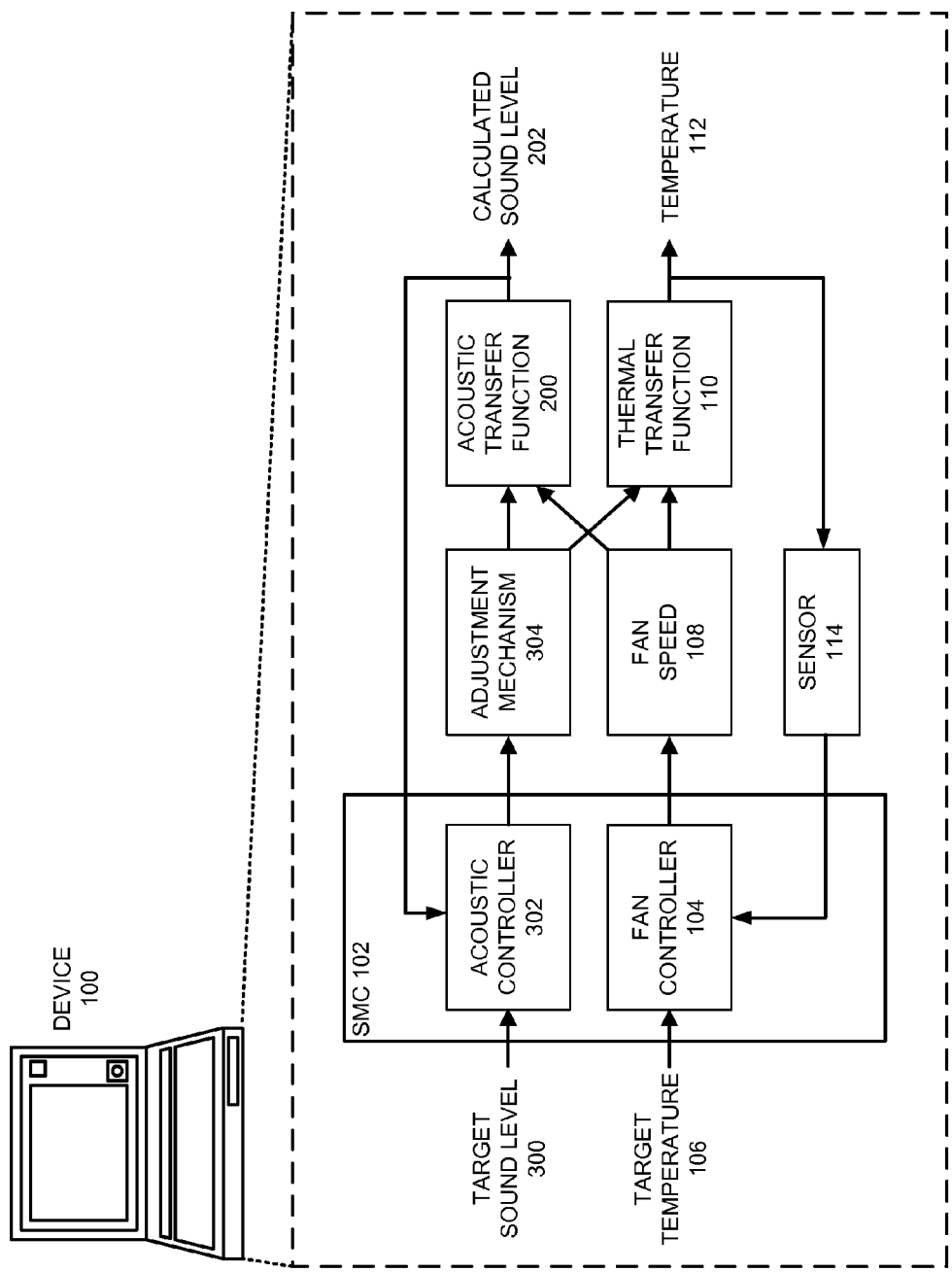
FIG. 3 illustrates the high-level operation of a device with an integrated thermal and an acoustic control system in accordance with an embodiment of the present invention.

FIG. 3 illustrates the high-level operation of a device with an integrated thermal and acoustic control system. In addition to target temperature 106, this system also receives a target sound level 300 as an input to acoustic controller 302. During operation, acoustic controller 302 manages the device sound level by: (1) monitoring the target sound level 300 and the present output of acoustic transfer function 200 (e.g., the calculated sound level 202); (2) calculating the difference between the calculated sound level 202 and the target sound level 300; and (3) if necessary, using adjustment mechanism 304 to adjust a component in the device to match the calculated sound level 202 to the target sound level 300. Note that if the acoustic noise produced by the device is already below the target sound level 300 during operation, the acoustic controller 302 may not need to trigger any changes, and the thermal system dictates normal operation (as in FIG. 1). However, if the calculated sound level 202 exceeds the target sound level 300, the acoustic controller 302 may prompt an adjustment to ensure that the calculated sound level 202 is reduced. The acoustic control system shown in FIG. 3 can be implemented using a number of control-loop feedback mechanisms, such as a proportional-integral-derivative (PID) control loop that attempts to keep the calculated sound level 202 below and/or close to the target sound level 300.

Figure 4:
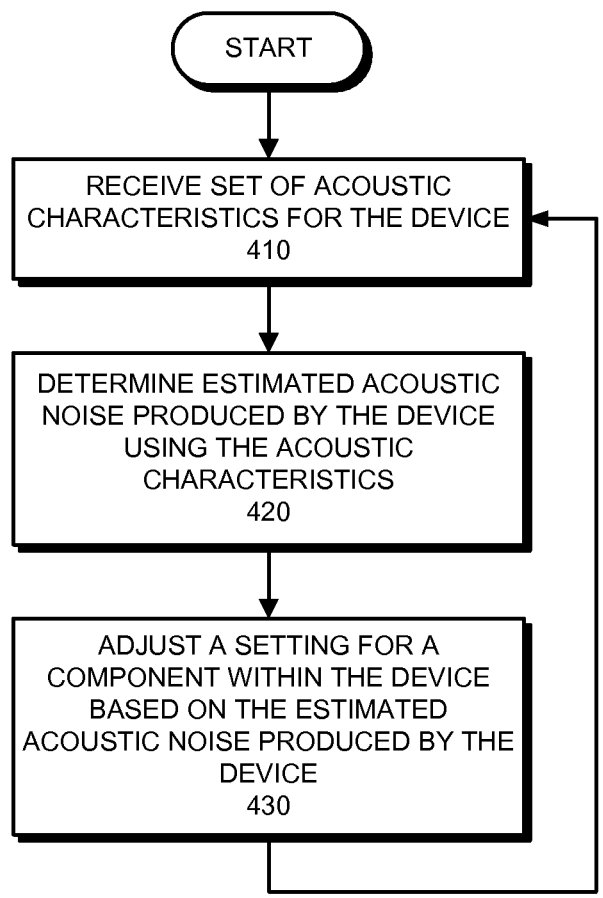
FIG. 4 presents a flow chart illustrating the process of managing the acoustic noise produced by a device in accordance with an embodiment of the present invention.

FIG. 4 presents a flow chart illustrating the process of managing the acoustic noise produced by a device. During operation, the system receives a set of acoustic characteristics for the device (operation 410). Next, the system determines an estimated acoustic noise produced by the device using these acoustic characteristics (operation 420). The system then adjusts a setting for a device component based on this estimated acoustic noise to manage the acoustic noise produced by the device (operation 430).

In one embodiment of the present invention, the adjustment mechanism 304 adjusts a power level for a device component to reduce the acoustic noise produced.

Including an acoustic control mechanism in the device allows direct feedback based on the calculated acoustic noise, but because the acoustic noise is often directly related to thermal cooling of components with specified heat tolerances, simply reducing cooling without addressing heat generation is not a long-term solution. The system may need to reduce the load on the thermal system (e.g., by reducing power consumption) to produce less acoustic noise and stay below a target sound level. The adjustment mechanism 304 in the feedback loop of FIG. 3 can adaptively throttle the power used by one or more device components to ensure that the device does not exceed the target sound level 300 and the target temperature 106. For instance, the system may adjust the power state of the component whose temperature is presently causing an increased fan speed for the loudest fan in the device.

Note that a target sound level for a device may change over time, and is likely to be dependent on user state and/or the environment the device is in. Because the primary goal of a given device is typically to perform some function (e.g., computation), and not only to minimize sound output, the acceptable target sound level may change over time, and hence power throttling may only be performed selectively. For instance, a user might expect a computer to be silent when off and nearly silent when idle, but might accept an increased sound output when the computer is operating under a high workload. Moreover, a user may prefer that a device located in a bedroom never produce any audible acoustic noise, but may accept increased acoustic noise from a device located in a very warm environment. Determining an acceptable target sound level for a device often involves inferring information about the device's function, one or more user states, and/or the environment the device is in.

In one embodiment of the present invention, the system detects and incorporates user and environmental state when determining a target sound level for the acoustic controller. The system can determine such state information in a number of ways. For instance, the system can request that an operating system (OS) for the device report an activity level for the system or for components of the system (e.g., for a central processing unit, graphics processing unit, or hard drive). While querying the operating system of a device is likely to provide very relevant state information, this technique assumes an interface and level of communication that may not be available. For instance, the acoustic controller may not have any way to communicate with the operating system, or there may not be any guarantee of which specific operating system is running on the device.

An alternative technique for determining state information is to directly monitor the power usage of the device. For instance, an SMC 102 may use power monitors built into the device hardware to determine user state based on the amount of power that the system or components are using. From such information, the system can determine whether the device is running, and can estimate the user load. In an acoustic controller that is closely integrated with a thermal controller, such power monitoring information may already be readily available to the acoustic controller. Integration with the thermal controller may also provide access to other useful inputs, such as an ambient temperature sensor for the device.

Figure 5:
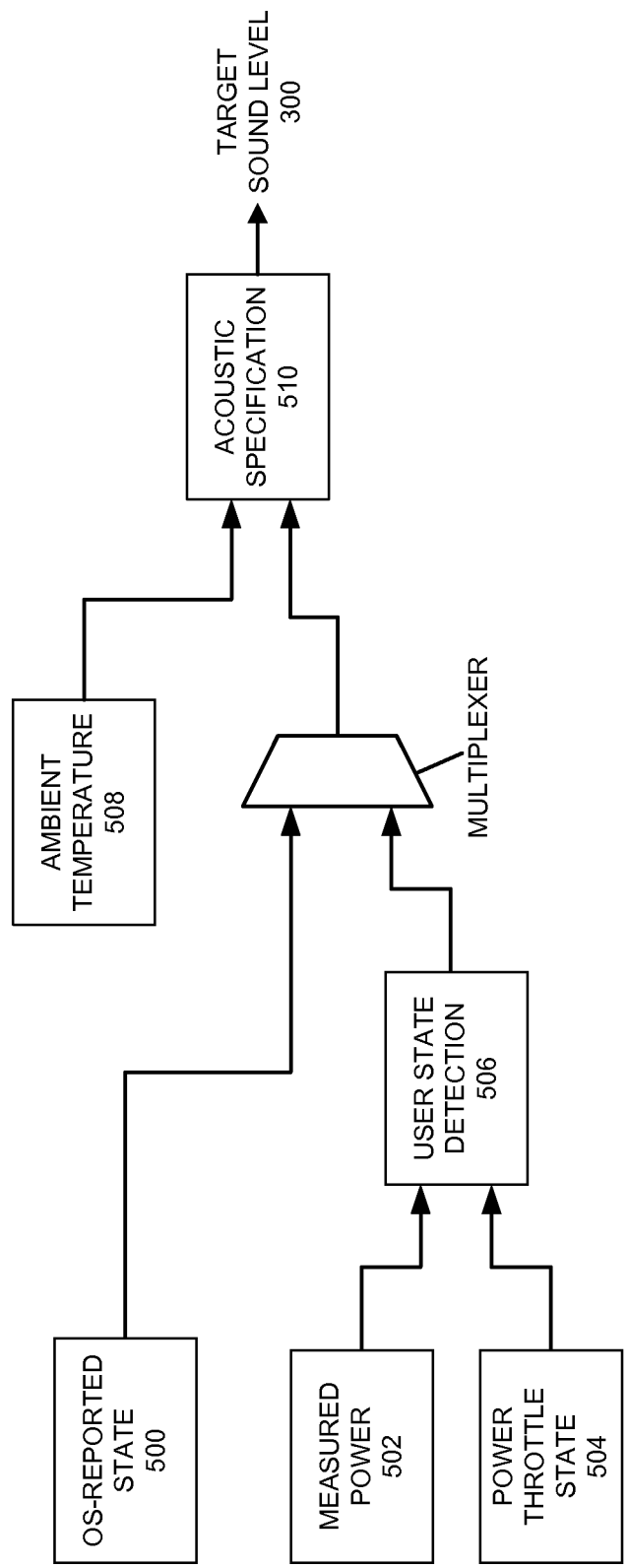
FIG. 5 illustrates several techniques for detecting user and environmental state from a device to determine a target sound level in accordance with an embodiment of the present invention.

FIG. 5 illustrates several techniques for detecting user and environmental state from a device to determine a target sound level 300. As described previously, the system can receive OS-reported state information 500, or can perform user state detection 506 by tracking the measured power 502 and the power throttle state 504. In the latter case, tracking the power throttle state 504 ensures that the user state is not misinterpreted when the acoustic system triggers a power adjustment, thereby avoiding erroneous feedback loops in the acoustic control system. For instance, a smaller amount of measured power may still indicate a heavy-use mode when in a power-throttled state. After gathering this data, along with any other available data (such as a measured ambient temperature 508), the system then determines a target sound level 300 using the acoustic specification 510. Note that some systems may gather and/or confirm such state data by using multiple techniques simultaneously, while others may only incorporate one such technique.

In one embodiment of the present invention, the acoustic control system is used during device testing to gather diagnostic data and to ensure that the device operates within a set of specified acoustic bounds. During testing, devices are often monitored to ensure that their cooling system is functioning properly and that their operating temperatures do not exceed a target temperature. However, in a device with a partially functioning cooling system (e.g., a poorly attached heat sink), the device may still successfully pass a diagnostic test but substantially increase the load on the cooling system and thereby produce an undesirable level of acoustic noise. Use of an acoustic control system during device testing allows such behavior to be detected and monitored, thereby assuring that only devices that adhere to the acoustic specification are released to customers.

Ambient Adaptation

In one embodiment of the present invention, the system includes a microphone that detects ambient noise. The system can use this microphone to determine the ambient sound level, which it then compares to the calculated sound level to determine how much the calculated system noise contributes to the sound level of the surrounding environment. In a room with a high ambient sound level, the acoustic controller may allow the system to exceed the acoustic specification and run at a higher power level. For example, a user who is playing loud music is not likely to notice the relatively small noise contribution of a computer cooling system. Hence, the system can use ambient noise measurements to adjust the target sound level.

Figure 6:
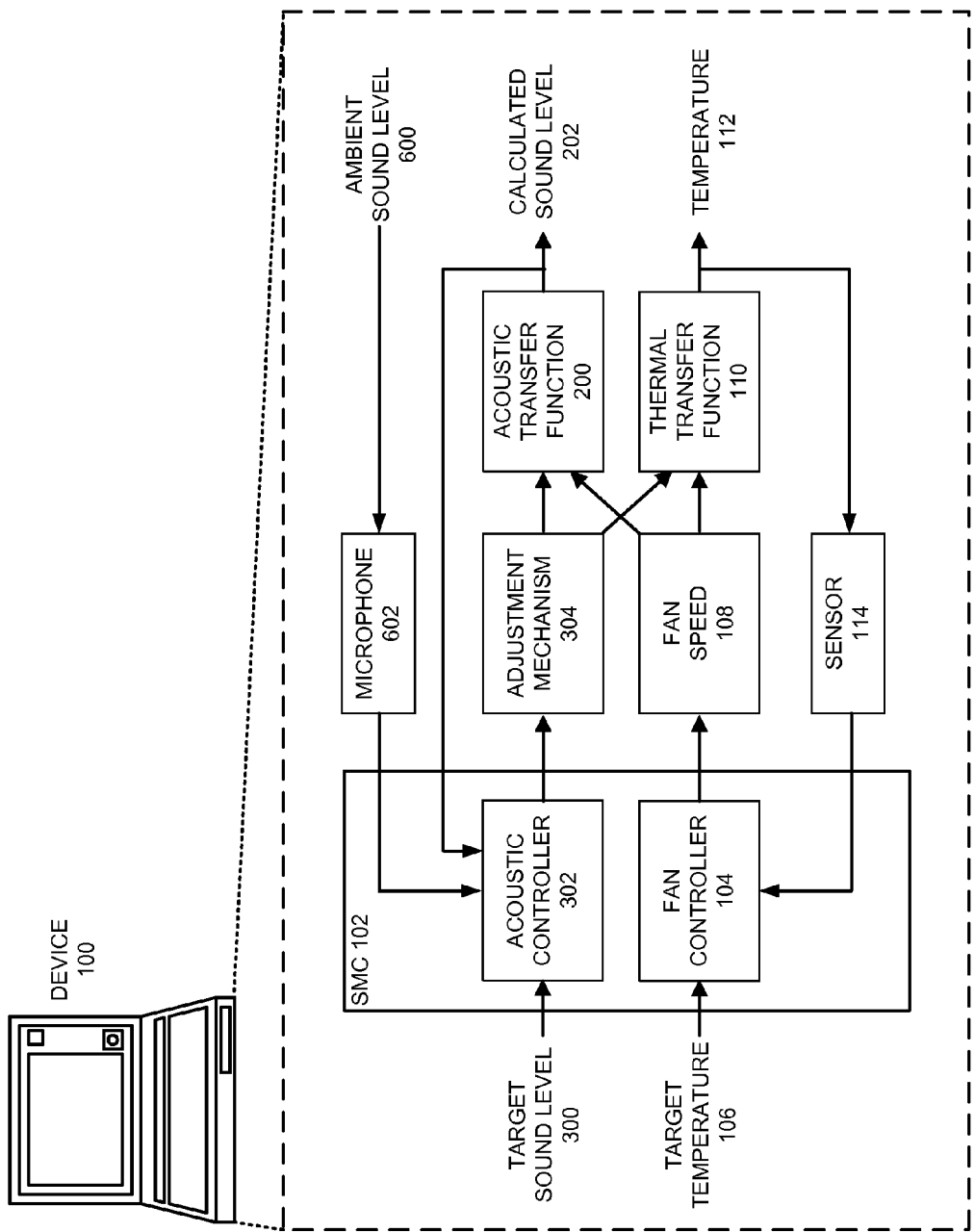
FIG. 6 illustrates the high-level operation of a device that incorporates a microphone for ambient adaptation in accordance with an embodiment of the present invention.

FIG. 6 illustrates the high-level operation of a device that incorporates a microphone 602 for ambient adaptation. During operation, microphone 602 measures the ambient sound level 600, and then presents ambient sound data to the acoustic controller 302, which considers this data in its decision-making process. The acoustic controller 302 may adjust, or choose to disregard, the target sound level 300 based on the input from the microphone 602.

In one embodiment of the present invention, the system uses the microphone to identify and characterize noise-producing components in the device. For instance, a device may selectively enable components during a boot process to measure their individual acoustic noise outputs, as well as to compare the actual acoustic noise produced by a specific given component with acoustic characterization data determined for a representative in an acoustic lab. Note that while the microphone included in the device may be of significantly lower fidelity than microphones used by acoustical engineers to characterize components, such input may still be useful. For instance, microphone input could serve as a useful reality check when performing a self-test to detect a failing component.

In one embodiment of the present invention, the system performs real-time acoustic monitoring to manage the acoustic noise produced by a device during operation. The described system:
  allows designers to incorporate higher power components without degrading the user's acoustical experience by allowing the system to directly respond based on measured acoustic state information;
  enables system designers to more easily determine the acoustic impact of changes to the design, such as modifying the device enclosure, changing component and/or component power options, and changing the thermal control system;
  facilitates identifying acoustic outliers among components and device states during device development;
  facilitates monitoring the acoustic impact of the thermal control system's response to transient events; and
  allows the development of diagnostics that can verify that production units meet an acoustic specification.

Note that individual components of the described system can also be valuable in isolation. For instance, the acoustic transfer functions in isolation can be useful for data collection and real-time analysis, while power throttling may be useful in isolation to reduce sound levels when a device is idle.

"Acoustic Annoyance"

System designers may approach acoustic noise reduction using a variety of approaches. For instance, a thermal-centric approach may focus on reducing the acoustic noise produced by components of the thermal system. In a thermal-centric approach that tracks both thermal and acoustic margins but emphasizes thermal control, there may be no attempt to maximize a specified acoustic margin and reduce the acoustic noise produced unless strictly needed. As described previously, the typical role of a thermal cooling system in a device is to ensure that all critical components in a device are sufficiently cooled. Reducing the acoustic noise generated by the fans and/or pumps of the thermal control system might be a secondary goal in a thermal-centric view, and the system may only throttle back on performance when the acoustic margin goes to zero. For instance, a thermal control system may be designed to slow down one or more fans to reduce acoustic noise levels only if the present level of cooling is more than sufficient to control the present heat level.

An alternate acoustic-centric approach might seek to reduce the acoustic noise produced by a device as a primary goal, by incorporating a system that continuously monitors and attempts to reduce the acoustic noise produced by a device. Such an acoustic-centric model might use neither an acoustic specification nor an acoustic margin, with the system instead always seeking to reduce the acoustic noise produced, as long as such efforts do not put the device at thermal risk. Within such thermal bounds, the system may choose to reduce thermal margin to reduce the level of acoustic noise output by the device. Note that both an acoustics-centric approach and a thermal-centric model may be valid and/or useful, e.g., depending on an environment, user, and/or use scenario.

Determining how to reduce the acoustic noise generated by a device can be difficult. For instance, in a system with multiple noise sources, reducing a given fan's speed may not provide any benefits if the noise from that one fan has a negligible contribution to the total device noise. Furthermore, in some situations, slowing down a fan in an attempt to lower the present radiated noise level may actually cause later acoustical harm, because eventually the thermal control system is likely to increase the fan speed again, or cause other fans to speed up, potentially resulting in a subsequent increase in the audible acoustic noise produced by the device and/or annoying pitch changes due to the changing fan speeds. Hence, while reducing a fan's speed may successfully reduce the acoustic noise produced by the device, such a reduction may not result in a corresponding reduction of the "acoustic annoyance" perceived by a user.

Acoustic annoyance can involve additional factors beyond the instantaneous sound pressure level ($L_P$). Exemplary factors that can lead to acoustic annoyance can include, but are not limited to, one or more of the following:
  Steady-state acoustic noise levels, for instance measured as a sound pressure level ($L_P$) and/or a sound power level ($L_W$) that describes the total sound energy produced by a noise source;
  Weighted acoustic noise levels, such as $L_{PA}$ and $L_{WA}$, which measure frequency-averaged sound-pressure and sound-power levels that have been averaged in a manner that emphasizes the frequency range heard by humans ("A-weighted");
  Short-term oscillations of acoustic noise levels (e.g. surges and/or dips in an acoustic noise level that can be measured and expressed in terms of $L_P$ and/or $L_W$);

Long-term oscillations of acoustic noise levels (e.g. a ramping up and/or down of an acoustic noise level that can be measured and expressed in terms of $L_P$ and/or $L_W$);

Steady-state sound qualities (e.g., beats, tonality, dissonance, roughness, sharpness), which may be measured and expressed using a variety of metrics; and Short- and/or long-term oscillations or changes in sound qualities.

Note that sound qualities are often measured and expressed using a number of metrics derived from time- or frequency-domain data. Sound qualities can include metrics such as: loudness (N); sharpness (S); roughness (R); fluctuation strength (FS); tonality (T); modulation (M); and prominent discrete tones (PDTs) (e.g., as identified by using a prominence ratio (PR) or a tone-to-noise ratio (TNR) technique). The set of sound qualities of interest may vary depending on factors such as a device type and a related industry (e.g., automotive products), and can include additional commercial and/or public-domain sound-quality metrics.

Note that the acoustic annoyance produced by a device may also depend on several external variables. For instance, potential acoustic annoyance may also depend on:

Hearing characteristics of a user/listener;

A noise sensitivity of a user/listener;

The computer usage and/or activity of a user;

Environmental factors (such as temperature and/or acoustic characteristics of a room, such as an ambient noise level);

General acoustic expectations of a user (e.g., "all computers are loud" or "this device should be quiet because it was expensive"); and Specific acoustic expectations of a user (e.g., "checking email should be quiet" or "computationally intensive tasks can be loud").

Due to such factors, determining a level of acoustic annoyance produced by a given device can be a very complex operation. For instance, a user may be more disturbed by a device that produces a quiet-but-tonal acoustic noise than by another device that produces a louder, but smooth-sounding, noise. The tonal nature of this acoustic noise may be independent of an individual fan's speed or noise level, and hence more difficult to detect and mitigate. A system that accounts for and manages such additional factors often needs to be aware of both the present and upcoming acoustic states of the device, as well as the acoustic consequences of going from one acoustic state to another.

Because of the wide range of potential acoustic annoyance factors, and the lack of a clear unifying metric that can accurately describe acoustic annoyance for a wide range of listeners, one embodiment of the present invention enables the system to use a flexible acoustic annoyance model (AAM) that specifies the factors of interest for a given scenario (e.g. user, device, and/or environment).

Acoustic annoyance models for a given scenario may include one or more of the following:

"Elemental" acoustic quantities, such as measured time-domain data;

Frequency spectra derived from the time-domain data;

Second-level quantities derived from the elemental acoustic quantities and/or frequency spectra, such as frequency-averaged $L_P$ and $L_W$;

Quantities derived from the above quantities (e.g., loudness, roughness, prominent discrete tones); and High-level quantities derived from all of the above qualities.

Note that a high-level AAM may include additional sound quality metrics that are created based on linear combinations that aggregate one or more "building block" metrics (such as the exemplary metrics described above) into a aggregate sound quality metric that more closely characterizes the acoustic annoyance produced by a device. For instance, an exemplary AAM might:

Assume that minimizing $L_P$ alone is sufficient to reduce acoustic annoyance;

Use the time variation of loudness as the primary metric of acoustic annoyance, wherein loudness takes into account an average frequency weighting (e.g., an A-weighting used on $L_P$ values) as well as an amplitude-dependent frequency weighting (i.e. a human frequency response curve that varies across the spectrum of quiet to loud sounds);

Pinpoint PDTs as the primary cause of acoustic annoyance; or

Combine loudness, tonality, and $L_P$ to define a "meta" metric for acoustic annoyance.

An AAM provides a concrete target for the system to track and attempt to minimize. The following sections describe in greater detail the techniques and data needed to determine and manage the acoustic annoyance for a device using an AAM.

Characterizing Sound Qualities Produced by Components

In one embodiment of the present invention, reducing the acoustic annoyance of a device involves providing the system with stored data that enables the system to determine the device's acoustic noise output at any given moment and a set of rules that help guide decisions based on this knowledge.

Stored data characterizing the acoustic characteristics of a noise-producing component can be determined using an acoustic measurement process. For instance, such acoustic characteristics may be measured in a specialized environment (e.g., a hemi-anechoic chamber) using precise instrumentation (e.g., high-quality measurement microphones and a data acquisition system that provide a signal-to-noise ratio sufficient for accurate data collection in all device and/or component states). Acoustical engineers can use such equipment in a range of geometries (e.g., an individual microphone, a series of microphones, and/or a head and torso measurement system) to measure the acoustic noise for each noise source in a device at every state that is expected during actual use of the device. For instance, measurements for one fan in a tower computer would include information for every fan speed expected to be encountered. For each such state, the measurement system measures and calculates quantities such as $L_P$, $L_W$, and various sound quality metrics. Note that because the acoustic noise produced by a component may be dependent on other driving components (e.g., a power-supply type), the measurement system strives to drive each noise-producing component individually in a manner substantially similar to how the component will operate under real-life conditions.

Note that aggregating individual noise levels to produce an aggregate noise level for a device often depends on mutual incoherence of individual noise sources. The measurement process may include performing validation measurements to determine whether mutual incoherence exists for multiple noise sources of interest. For instance, the measurement system may first measure noise emanating from three different installed fans individually, one at a time, at various speeds, and then measure all three fans running simultaneously. Next, the measurement or post-processing system can perform linear superposition of the measured data (e.g. $L_P$ or $L_W$ data) to check that the sum of these noise sources matches the measurement when all of the noise sources were run together.

Note that some sources may not be mutually incoherent with regard to noise emission, perhaps due to one component being electrically, mechanically, or aerodynamically affected by the presence of another component. For instance: vibration from one component may affect the vibration of another nearby component; back pressure produced by one fan may affect the speed and consequent acoustic noise produced by another fan; or the radiation impedance seen by one vibrating object may be changed due to the acoustic field produced by other radiated objects (including the initial object itself). Such "coupling effects" may be detected during the measurement process, and then, depending on the complexity of the effect, either accounted for (perhaps using an estimate) or ignored (if the effect is minimal compared to the magnitude of the overall set of measurements for the noise source(s)).

In one embodiment of the invention, the system receives measurement data for a set of noise sources in the form of an acoustic state matrix (ASM). This ASM stores measurement and characterization data for sound levels and sound qualities in a variety of formats that provide different granularities and/or levels of detail. For instance, the measurement efforts may produce different levels of averaged measurement data suitable to be used in a range of device types to provide different levels of acoustic control. An ASM for a simple device with limited storage space may only incorporate highly-averaged measurement data (e.g., a large data set of frequency spectra compressed into a limited set of $L_P$ values (measured in dB) for several device states, or a set of curve-fit coefficients that require minimal storage space but can be used to roughly compute $L_P$ values). Alternatively, an ASM for a complex device with a sophisticated acoustic control system may include a full spectrum of raw measurement data (e.g., a full-narrowband frequency spectrum for each noise source) that can be used during operation for more complex computations. Storing such raw measurement data preserves data characteristics that might otherwise be lost in averaging, thereby allowing the device to use the full spectrum of original data at a later point. For instance, while combining frequency data into bins (e.g., by octave) can reduce the number of data values to be stored, the resulting data representations may lose detail important to a PDT metric, which may no longer be able to detect the presence of frequency spikes in the averaged results (e.g., the operation of adding multiple frequency spectra and then applying an averaging metric is not commutative, due to loss of detail from the averaging operation). Storing the original frequency data can also be useful when receiving and/or developing new sound-quality metrics that consider specific noise frequencies.

Note that the measurement data can be stored in different forms, including: individual binary values; a compressed set of binary values; curve-fit formulae; and one or more formulae that predict noise emission from individual noise sources or combinations of noise sources. For instance, a fan may be described by a set of equations that include: "fan law" equations that predict the fan noise as a function of fan speed; "fan curve" equations that describe the fan noise as a function of back pressure and air flow; and/or "fan beat" equations that predict beat frequencies from multiple fans by using knowledge of the number of fan blades on each fan and the present fan speeds of all the fans in the device. Note that data derived from data gathered during the measurement process may also be supplemented with additional data from other sources, for instance in the form of tabular or graphical behavior received from component suppliers.

Table 2 illustrates an exemplary ASM for a given device that includes acoustic pressure data gathered for each acoustic noise source in the device (Column 1) in a number of different states (Column 2). This acoustic pressure data has also been post-processed to produce a number of weighted noise metrics (Column 3), such as $L_{PA}$, $L_{WA}$, $L_P(f)$, $L_W(f)$, N, and T. Note that $L_P(f)$ and $L_W(f)$ are equations that return the sound-pressure and sound-power levels, respectively, as a function of frequency f, and can encompass either narrowband or constant-percentage band (CPB) frequency spectra (where the CPB frequency spectra includes third-octave-band and octave-band data). Note that an ASM can range in complexity (as needed), for instance describing: a large number of noise sources with many operating states; a large (or small) number of frequency-averaged noise descriptors or frequency-dependent quantities; and very dense frequency information (or none at all). Note also that an ASM may be described using a variety of data structures.

The ASM illustrated in Table 2 provide estimates of the acoustic noise produced by a set of noise-producing components. For instance, during operation, the system can look up the sound power level $L_W$ being produced by fan #2 in the 8350 Hz frequency range when fan #2 is running at 3400 rpm. To determine the acoustic state of the entire device at a given instant in time (e.g., at time $t_1$) the system needs to know the operating state of each noise source. For instance, to find the radiated sound power level at 8350 Hz at time $t_1$, the system may poll a set of sensors to determine that: fan #1 is at 2500 rpm; fan #2 is at 3400 rpm; the hard drive is at a high level of activity; and the optical drive is running at half speed. The system then uses this information and the $L_W(f)$ functions associated with the noise sources to determine an aggregated acoustic noise level for the device at 8350 Hz.

TABLE 2

| Noise Source | Noise Source State | Noise Metric | Frequency |
| --- | --- | --- | --- |
| Fan #1 | 500-3000 rpm (in 100 rpm increments) | $L_{PA}$, $L_{WA}$, $L_P(f)$, $L_W(f)$, N, T | 20 Hz-15 kHz (4 Hz incr.) |
| Fan #2 | 800-4000 rpm (100 rpm increments) | $L_{PA}$, $L_{WA}$, $L_P(f)$, $L_W(f)$, N, T | 20 Hz-15 kHz (4 Hz incr.) |
| Hard Drive | low, medium, high | $L_{PA}$, $L_{WA}$, $L_P(f)$, $L_W(f)$, N, T | 20 Hz-15 kHz (4 Hz incr.) |
| Optical Drive | off, half-speed, full-speed | $L_{PA}$, $L_{WA}$, $L_P(f)$, $L_W(f)$, N, T | 20 Hz-15 kHz (4 Hz incr.) |

Aggregating Sound Metrics

In general, noise metrics cannot simply be summed to arrive at a total noise level. Some metrics, however, have known equations valid for certain circumstances. For instance, a set of mutually-incoherent $L_P$ or $L_W$ values can be more accurately aggregated using the mathematical equation:

$$L_{PTotal} = 10 \log \left[ 10^{\frac{L_{P1}}{10}} + 10^{\frac{L_{P2}}{10}} + \ldots + 10^{\frac{L_{Pn}}{10}} \right],$$

where n=the number of noise sources. However, as an alternative to implementing the potentially-computationally-intensive operations of this logarithm-based equation on a resource-constrained device, a control system may instead use a less complex approximation. For instance, the rule-of-thumb illustrated in Table 3 can be effective when working with frequency-averaged quantities such as $L_{PA}$ and $L_{WA}$. However, when aggregating quantities that are functions of frequency, such as $L_{PA}(f)$ and $L_{WA}(f)$ (the narrowband or CPB spectra of $L_{PA}$ and $L_{WA}$, respectively), an equation such as the one shown above can be used to ensure that the total $L_{PA}$ and $L_{WA}$ are summed independently for each frequency, thereby ensuring that the total values remain functions of frequency.

In one embodiment of the present invention, the system receives a set of aggregation techniques that can be used to aggregate two or more acoustic noise descriptors. For instance, the system may receive an aggregation method table (AMT) that describes a set of noise metrics and their corresponding aggregation techniques. The AMT allows aggregation techniques to be defined in a flexible manner, on a per-metric basis. An AMT can also include multiple techniques that can be used on for a single metric (e.g., on a situational basis) and be updated during operation to reflect advances in aggregation research.

TABLE 3

1) Sort dB values in order from smallest to largest.
2) Combine the first two values as follows:
    If values differ by 0-1 dB, add 3 dB to the higher value of the two values and remove the lower value from the list.
    If values differ by 2-3 db, add 2 dB to the higher value and remove the lower value.
    If values differ by 4-9 db, add 1 dB to the higher value and remove the lower value.
    If values differ by 10+ db, add 0 dB to the higher value and remove the lower value.
3) Repeat, comparing the first two values of the remaining list, until a final total value is determined.

Table 4 illustrates an exemplary AMT for a device. Note that noise metrics other than $L_P$ and $L_W$ (e.g., T and an exemplary sound quality that measures "Dullness" (D)) may have different rules for aggregation, or may sometimes not be able to be aggregated at all. As a hypothetical example, the aggregation technique for metric D may simply add together the individual dullness values, while the aggregation technique for metric T chooses the maximum individual tonality produced by the set of noise sources.

TABLE 4

| Noise Metric | Aggregation Technique |
| --- | --- |
| $L_{PA}$ | $10 \log \left( \sum_i 10^{\frac{L_{Pi}}{10}} \right)$ |
| $L_{WA}$ | $10 \log \left( \sum_i 10^{\frac{L_{Wi}}{10}} \right)$ |
| $L_P(f)$ | $10 \log \left( \sum_i 10^{\frac{L_{Pi}(f)}{10}} \right)$ |
| $L_W(f)$ | $10 \log \left( \sum_i 10^{\frac{L_{Wi}(f)}{10}} \right)$ |
| Dullness (D) | $D_1 + D_2 + D_3 + \ldots D_i$ |
| Tonality (T) | $Max(T_1, T_2, T_3, \ldots, N_i)$ |

Access to (and the ability to aggregate) a wide range of acoustic noise metrics provides a wealth of frequency-dependent parameters that can be used to enable advanced modeling of acoustic annoyance and enhanced capabilities for managing acoustic noise.

Decision Logic for Comparing Acoustic States

The previous sections describe techniques and data that a system can use to determine whether an acoustic noise metric or a combination of acoustic noise metrics have increased or decreased during operation (e.g., due to changes in the state of device components, such as a fan speed decrease). The system can use the knowledge in the ASM(s) and AMT to derive acoustic annoyance and track the values for relevant metrics over time. When comparing two or more acoustic states, the system may consider a set of criteria to determine whether the acoustic annoyance produced by the device is increasing or decreasing. These criteria often include psychoacoustic (i.e., perception of sound) criteria that encompass both steady-state noise effects as well as transitions in the emitted acoustic noise.

TABLE 5

Is $L_P$ reduced or increased? Is T reduced or increased?
If either of $L_P$ or T are decreased, does the acoustic annoyance caused by the transition outweigh the reduction in acoustic noise levels?
If either of $L_P$ or T are decreased, is the decrease smaller than the JND (or smallest perceivable change in a quantity)?
Even if $L_P$ or T have decreased, is the initial state already masked by ambient noise levels in the environment (e.g., a decrease in acoustic noise output will not be noticed)?
Even if $L_P$ or T have decreased, do either the initial or final state lie beneath the threshold of audibility for an average user?
Even if $L_P$ or T have decreased, does the final state result in a noise output that a specific user will not notice (perhaps based on some sort of user input)?
Even if $L_P$ or T have decreased, does the final state result in a noise output the user will not notice due to the current operational state of the computer (e.g., due to audio noise being output by the device during game play)?
Even if $L_P$ or T have decreased, does the final state result in a noise output that will not cause user annoyance due to the user's expectation of noise for the current operational state of the device (e.g., computationally-intensive rendering)?
Does the transition from the initial to the final state pass through a state with a higher $L_P$ or T than both the initial and final state? (e.g., perhaps due to interactions between multiple noise sources, such as beats).
If $L_P$ or T do not both increase or both decrease, which one is more important?
Even if $L_P$ or T have both decreased, does the time rate of change for these metrics meet acceptability criteria?
Does a time history show long- or short-term oscillations in either $L_P$ or T due to attempts to decrease one or both of the values for these metrics? If so, does the increase in annoyance due to these oscillations outweigh short-term decreases in annoyance?

In one embodiment of the present invention, the system incorporates decision logic to determine the overall level of acoustic annoyance for the device over time. For instance, the device may receive a set of psychoacoustic criteria and transition rules (PCTR) that provide a framework for making decisions based on the acoustic annoyance model. The system uses these PCTR to determine an acoustic annoyance based on the total noise for every device state, as well as to determine an acoustic annoyance for the device as a function of time. These PCTR may be different for each device, environment, and user, and may be derived from a variety of sources, including, but not limited to, gathered laboratory data, research data, marketing data, and/or user input.

Table 5 illustrates a set of exemplary PCTR for a device that is transitioning from an initial acoustic state to a second acoustic state. The system evaluates the illustrated criteria and rules in light of available data to determine whether the acoustical annoyance produced by the device is increasing or decreasing due to the change in state. Note that while the PCTR in Table 5 illustrate only one exemplary objective metric ($L_P$) and one exemplary sound quality metric (T) explicitly, the PCTR can be extended to include an arbitrary set of additional and/or different metrics that correspond to an associated AAM. Note also that the system may not have the data needed to evaluate each given criteria and/or rule at a given time. In this case, the system may store the available data, not use PCTRs that do not yet have data available.

Managing Acoustic Noise

The timeframe and the granularity of acoustic changes can be an important consideration when making decisions regarding whether or not acoustic annoyance is being decreased. For instance, while thermal control systems often use a fine time interval during operation, if the time steps for the evaluation of acoustic changes are too small the system may see no improvement due to the overly-fine time granularity. Using a longer time interval between checks can also reduce the load associated with managing acoustic noise, for instance by reducing the associated amount of computation and data-access speed (for acoustic-noise data).

In one embodiment of the present invention, the system tracks such acoustic changes in an acoustic annoyance state matrix (AASM) that tracks the history of system state and acoustic annoyance. The AASM maintains a time history of acoustic states, rates of change, and oscillations. This AASM, in combination with a set of PCTR, allows the system to (1) determine changes in acoustic annoyance over short-term and long-term time periods, (2) evaluate, at suitable time steps, whether the acoustic annoyance (as specified by the AAM(s) for the device) is being reduced, and (3) make intelligent decisions about how to minimize acoustic annoyance. Storing acoustic annoyance data in the AASM enables the system to simultaneously track acoustic annoyance over multiple time intervals, and thereby detect changes in steady-state fan speed, long-term acoustic noise oscillations, acoustic noise ramps, surges of emitted acoustic noise, and other acoustic factors.

In one embodiment of the present invention, the system uses acoustic state data and an acoustic annoyance model to adjust a setting for a device component. Note that the system can determine present and expected estimates of acoustic noise before, during, and/or after making such adjustments. For instance, when the system determines via thermal monitoring that a fan speed can be reduced, the system can use the data from the ASM and AMT to determine whether this change would be of acoustical benefit as well. Moreover, the system can also attempt to determine factors such as: (1) how to decrease (or increase) the rate with which a fan speed is adjusted to minimize user annoyance (according to the AAM); (2) the likelihood that the fan speed will need to be increased again in the near future (based on historical data), and the potential to trigger annoying oscillations. Minor changes to the adjustment process may significantly reduce the acoustic annoyance produced by a device.

Figure 7:
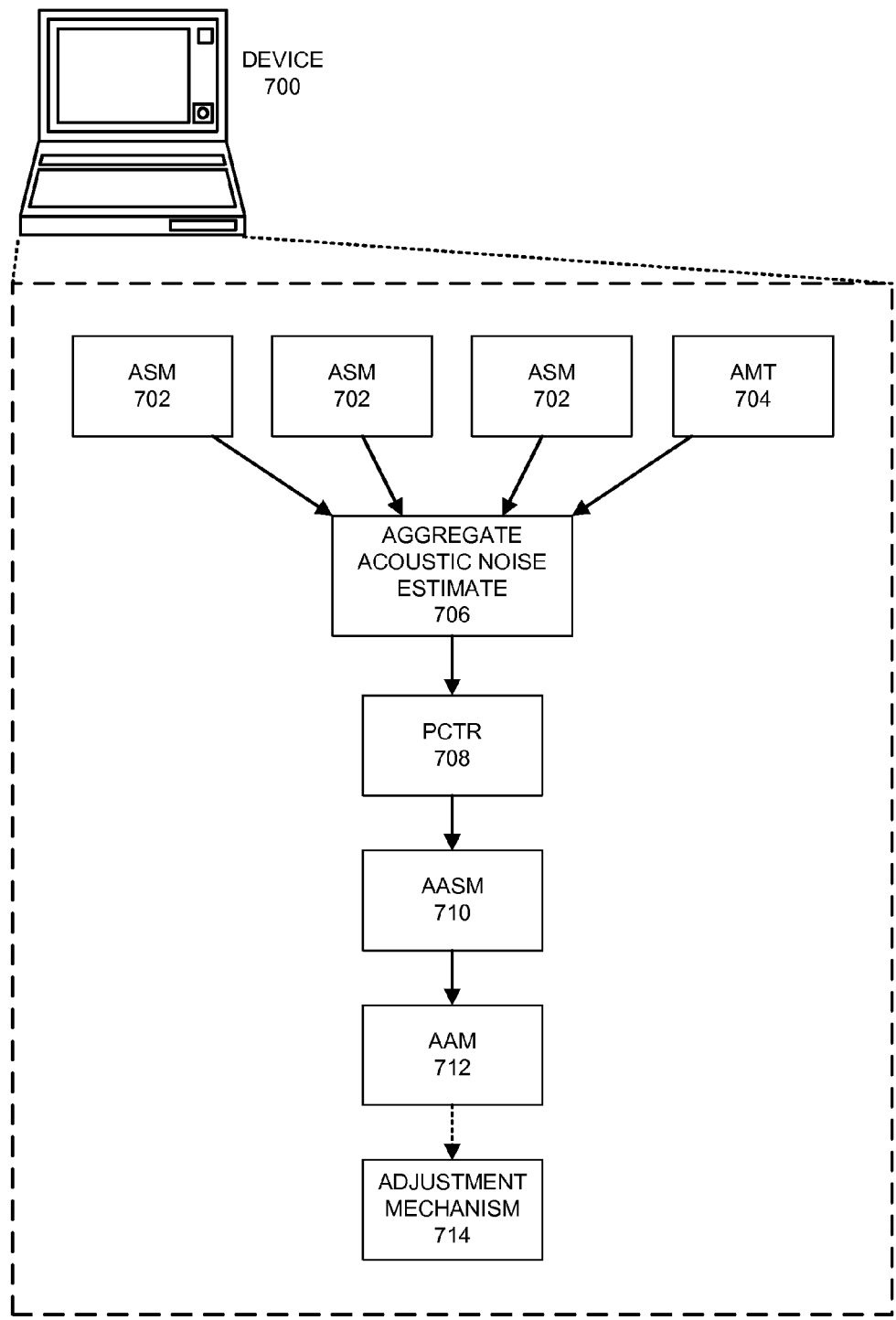
FIG. 7 illustrates a system that reduces acoustic annoyance by managing the acoustic noise produced by a device in accordance with an embodiment of the present invention.
Figure 8:
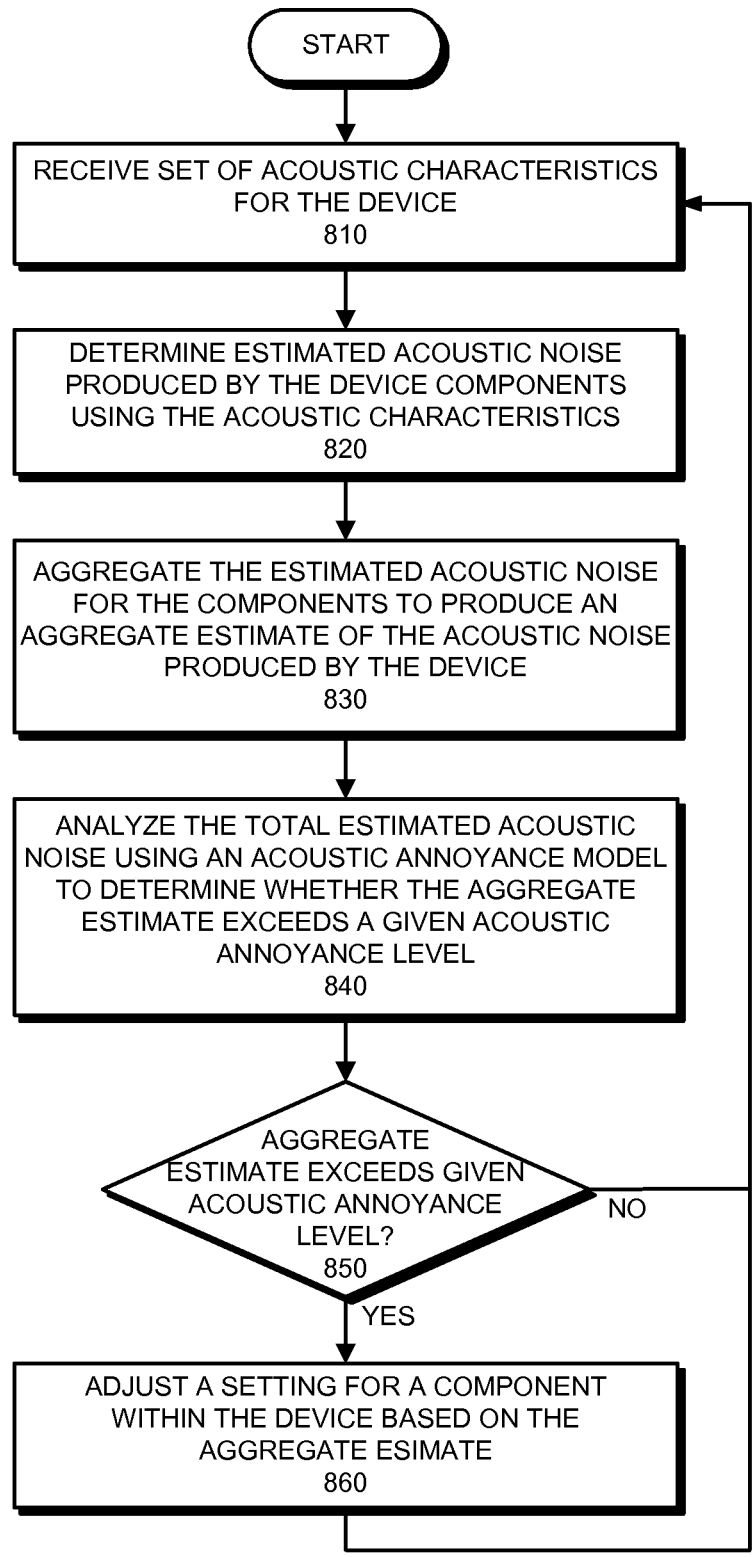
FIG. 8 presents a flow chart illustrating the process of reducing acoustic annoyance by managing the acoustic noise produced by a device in accordance with an embodiment of the present invention.

FIG. 7 illustrates a system that reduces acoustic annoyance by managing the acoustic noise produced by a device 700, and FIG. 8 presents a flow chart illustrating the process of reducing acoustic annoyance by managing the acoustic noise produced by device 700.

During operation the system receives a set of acoustic characteristics for device 700 (operation 810). These acoustic characteristics include acoustic state matrices (ASMs) 702 for each noise-producing component in device 700 as well as an aggregation method table (AMT) 704 that describes how to aggregate a set of acoustic noise factors associated with the noise-producing components in the device. The system uses ASMs 702 to determine at one instance in time an estimated acoustic noise produced by the device components (operation 820). Next, the system aggregates the estimated acoustic noise for the components (using AMT 704) to produce an aggregate estimate of the total acoustic noise produced by the device 706 (operation 830). The system analyzes this total estimated acoustic noise 706 using an acoustic annoyance model (AAM) 712 to determine whether the aggregate estimate exceeds a given acoustic annoyance level (operation 840). For instance, the system may compare the present aggregate acoustic noise estimate 706 with a previous set of state data using psychoacoustic criteria and transition rules (PCTR) 708. The result of this comparison is a measure of acoustic annoyance that is added to a set of historical acoustic annoyance data stored in an acoustic annoyance state matrix (AASM) 710. The system can use the data in the AASM 710, in conjunction with AAM 712, to determine if there is an excess of acoustic noise, and, if so, to judge when or how to respond to reduce the acoustic annoyance for the device. For example, the system can determine whether the aggregate estimate exceeds a given acoustic annoyance level (operation 850). If so, the system uses adjustment mechanism 714 to adjust a setting for a component within device 700 based on data from AASM 710, AAM 712, and the aggregate acoustic noise estimate 706 (operation 860). The system repeats this process on an ongoing basis (especially after device state changes), thereby continuously monitoring (and minimizing) acoustic annoyance. Note that in some embodiments of the system, setting a desired acoustic annoyance level to "zero" (e.g., "try to generate no acoustic annoyance") causes the system to continuously attempt to reduce the acoustic annoyance of the device, thereby minimizing the acoustic annoyance experienced by a user over time.

Note that the described system supports a wide range of complexity in managing acoustic annoyance. For example, in a basic configuration: the ASMs include only $L_P$ data; the AMT includes only a logarithmic summation technique for adding $L_P$ values; and the PCTR includes logic that states that an increase in $L_P$ between two states results in an increase in annoyance (and vice versa). In such a basic configuration, the system calculates and tracks the total emitted $L_P$ and assumes that $L_P$ is proportional to acoustic annoyance. Alternatively, a more sophisticated system tracks acoustic annoyance by monitoring narrowband $L_P$ as a function of frequency and calculating and detecting the presence of PDTs in real-time. In addition to tracking reductions in $L_P$, this system may implement a control step where during fan speed changes the system detects whether the acoustic noise produced includes PDTs, and, if so, adjusts fan speeds slightly more (or less) to avoid such effects. For this configuration, the system allows that a higher noise level with a superior sound quality may sometimes reduce the acoustic annoyance perceived by a user. A third exemplary system calculates a full psychoacoustic annoyance model for each acoustic state change, with the goal of minimizing a set of specific calculated quantities.

Note also that an acoustic annoyance minimization can be integrated into thermal control techniques in a number of ways. Table 6 illustrates a simple acoustic-annoyance minimization strategy for an open-loop thermal control system that uses a look-up table to determine fan speeds for a given temperature. In this example, upward fan speed changes are performed immediately, to ensure that the thermal margin is always met. For downward fan speed changes, however, the system performs a number of checks and calculations to determine how a downward fan change can affect acoustic annoyance, and acts to minimize such effects.

In one embodiment of the present invention, the system manages acoustic annoyance across both decreases and increases in overall acoustic annoyance. For instance, as described previously, the system may make adjustments when a fan speed is being decreased, to ensure that the fan speed change and the final fan speed do not result in increased acoustic annoyance, and to ensure that the change results in an overall decrease in acoustic annoyance. Alternatively, when thermal risks prompt changes that will unavoidably increase the overall acoustic annoyance generated by the device, the system can still actively seek to manage and/or minimize the (unavoidable) increase in acoustic annoyance as much as possible.

In one embodiment of the present invention, the system provides a flexible framework that measures, adjusts, and responds to acoustic annoyance data. Such flexibility enables the system to grow and adapt by integrating new acoustic inputs from ongoing research and testing into ASMs, an AMT, PCTRs, and an AAM. For instance, the system can incorporate additional diagnostic data determined during development as well as during actual product use.

TABLE 6

1) Read temperature sensor.
2) Look up temperature in a look-up table to determine a corresponding fan speed.
3) Compare looked-up speed with current fan speed:
   a. If fan is already at this speed, no change.
   b. If fan is not already at this speed, determine if fan speed change is upward or downward.
4) Determine direction of fan speed change:
   a. If fan speed change is upward, adjust fan speed accordingly.
   b. If fan speed change is downward:
     1. Examine AASM. If downward fan speed change will result in an increase in net annoyance, do not decrease the fan speed further (or, alternatively, wait for several time intervals and re-evaluate)
     2. Calculate values from an ASM for the current fan speed and use an AMT to get the total acoustic noise for the device.
     3. Adjust the fan speed according to the looked-up speed.
     4. Calculate a new set of values from the ASM for the new fan speed and use the AMT to get the new total acoustic noise for the device.
     5. Use PCTR to determine if acoustic annoyance has increased or decreased due to the decrease in fan speed.
     6. Enter the result into an AASM
5) Repeat steps 1-4.

Incorporating User Input

In one embodiment of the present invention, the system receives an acoustic preference from a user. For instance, the system can present to the user a range of acoustic and performance options for a device, and then allow the user to choose whether the system should be quieter, at the cost of slower performance, or high-performance, but with higher associated acoustic noise. Alternatively, where possible, the user may also be allowed to choose to relax some portion of the thermal margin, and choose a point on a spectrum between "quieter and hotter" and "louder and cooler." For example, in a classroom environment, a laptop computer might be set to run slightly warmer but quietly, while in a louder environment it could be cooler but slightly louder.

Noise sensitivity can vary widely across different individuals. For instance, some people may be very sensitive to high frequencies but insensitive to low frequencies, while others may have poor hearing across all frequencies. Enabling an acoustic management technique to become aware of such individual conditions can assist when the system needs to decide between several acoustical scenarios. For example, the system may have a choice of slowing down a fan to make the device 3 dB quieter, but with the result of possibly causing a slow beat frequency between two fans. Alternatively, the system can keep the fans at the same speed, thereby prolonging a slightly higher noise level. Knowledge of specific user characteristics and preferences can assist in making a decision that most reduces user annoyance.

In one embodiment of the present invention, the system provides an acoustic calibration function that can be run by a user to customize and/or improve the user's acoustical experience. This calibration function could, for instance, ask simple questions regarding perception of acoustic noise while demonstrating (and/or outputting) various acoustical scenarios and/or noises, and use the resulting data to calibrate the acoustic noise management system. For instance, this calibration function can (with the cooperation of the user) perform one or more of the following:

Request the user to turn off all non-essential equipment in the environment and/or disable noise-producing components of the device for a given time interval to determine the ambient noise of the environment using a microphone;
   Request the user to turn on all typically-used equipment in the environment for a given time interval to determine the ambient noise of the environment using a microphone;
   Request that the user stay very quiet for a given time interval to allow the system to determine a more accurate ambient noise level;
   Perform a hearing test for a user by presenting and requesting feedback on tones of various amplitudes and frequencies that are presented to the user using a device audio system; and
   Allow the user to rate a set of sounds (e.g., pre-recorded sounds or actual fan and hard drive noise) to test user sensitivity to acoustic factors such as high and low levels of broadband noise, beat frequencies, dissonance, steady-state noise, transient noises, etc.

Data derived using the calibration function can be saved in a user profile and used by an AAM to customize acoustic decisions. For instance, an AAM enhanced with such additional knowledge can incorporate an actual threshold of audibility for a specific user (instead of a generalized threshold of audibility) in a set of PCTR.

A set of exemplary acoustic minimization decisions enabled by the described system (as well as the use of a calibration function) can include:

The system determines that a given fan's speed could be decreased, but after determining that the decrease will not result in an audible change in acoustic noise due to masking noise from other components and/or other ambient noise, decides to keep the fan's speed constant;
   When adjusting multiple fans for thermal control, the system avoids certain fan-speed combinations to reduce the possibility of beat frequencies;
   The system uses higher fan speeds that are known to cause high-frequency tones because the current user profile indicates that the particular user cannot hear such high frequencies;
   The system knows that a given user prefers slightly-increased acoustic noise over potential fan surges, and hence intentionally keeps a fan speed higher than strictly necessary (for thermal reasons) to overcool the device (e.g., creating a larger thermal margin that will reduce the likelihood of fan-speed changes);

The system detects higher ambient noise in "audio/visual modes," and allows louder fan speeds during such time intervals; and The system, when given a choice to increase the speed of one of two fans for thermal reasons, determines which fan-speed increase will cause a more tolerable acoustic change.

In summary, one embodiment of the present invention gives a device control system: (1) "awareness" of the actual acoustic noise level of each contributing noise source in a device at any given moment in time; (2) the ability to aggregate such individual noise levels and become aware of the actual total emitted acoustic noise at any given moment in time, and (3) the logic needed to decide whether a change in this total emitted acoustic noise due to a state change in the device results in increased or decreased acoustical annoyance to the user of the device. This knowledge allows the system to, if desired, adjust device settings to reduce acoustical annoyance. Note that the system is very flexible and extensible, and can store noise data for one or many noise sources, as well as: one or many noise descriptor metrics; one or many summation rules; and one or many psychoacoustic criteria for determining changes in acoustic annoyance. The system can be implemented as a step in a pre-existing thermal control system, or as a complex and sophisticated stand-alone acoustic control system. The system can also be integrated into a thermal control system, but then be partially or completely ignored if necessary without affecting thermal control.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing annoyance by managing the acoustic noise produced by a device, comprising:
    receiving acoustic characteristics for a plurality of noise-producing components within the device, wherein the acoustic characteristics comprises a predetermined respective acoustic transfer function for each of the plurality of noise-producing components, wherein the respective acoustic transfer function returns an estimate of sound pressure value in decibels that would be produced by the noise-producing component based on an operating state of the noise-producing component;
    determining an estimated acoustic noise that would be produced by each noise-producing component within the device during operation by using the respective acoustic transfer function with the operating state of the component as an input;
    aggregating the estimated acoustic noises for the noise-producing components within the device to produce an aggregate estimate of the acoustic noise that would be produced by the device;
    analyzing the aggregate estimate using an acoustic annoyance model to determine whether the aggregate estimate exceeds a given acoustic annoyance level; and
    adjusting a setting for a component within the device when the aggregate estimate exceeds the given acoustic annoyance level, to manage the acoustic noise produced by the device.

2. The method of claim wherein the adjusting a setting for a component within the device when the aggregate estimate exceeds the given acoustic annoyance level comprises:
    measuring a temperature within the device;
    determining whether adjusting the setting for the component within the device allows a thermal margin of the device to be met at the measured temperature; and
    adjusting the setting for the component within the device when the aggregate estimate exceeds the given acoustic annoyance level and where it is determined that the adjusted setting allows the thermal margin to be met.

3. The method of claim 1, wherein the respective acoustic transfer function returns one of (a) a decibel constant for the input, and (b) a decibel result of an equation where the input is a variable for the equation.

4. The method of claim 3, wherein the aggregate estimate is an aggregate sound pressure value in decibels and further wherein a aggregating the estimated acoustic noises for the noise-producing components within the device to produce the aggregate estimate of the acoustic noise that would be produced by the device comprises:
    using a system-total acoustic transfer function to sum the estimated sound pressure values for each noise-producing component.

5. The method of claim 3, wherein receiving the acoustic characteristics for the device includes:
    identifying a plurality of noise-producing components in the device; and
    characterizing each noise-producing component by calculating an estimated acoustic-noise profile for each noise-producing component;
    wherein each noise-producing component is characterized independently in a realistic operating environment to generate an accurate estimate of acoustic noise output.

6. The method of claim 5, wherein noise-producing components can include one or more of the following:
    a hard drive;
    an optical drive;
    a fan, blower, pump, or other cooling device;
    a capacitor;
    an inductor;
    an inverter; and
    a transformer.

7. The method of claim 1,
    wherein the acoustic annoyance model specifies an acoustic annoyance level that is associated with an undesirable sound quality and/or sound level for the acoustic noise produced by the device; and
    wherein the undesirable sound quality and/or sound level an include one or more of the following:
    steady-state acoustic noise levels;
    short-term and/or long-term oscillations of acoustic noise levels;
    steady-state sound qualities; and/or
    changes in a sound quality.

8. The method of claim 1,
    wherein analyzing the aggregate estimate of the acoustic noise involves checking the aggregate estimate before, during, and/or after adjusting the setting; and
    wherein the method further involves estimating an effect of adjusting the setting and compensating to ensure that the adjustment does not increase the aggregate estimate of the acoustic noise beyond the given acoustic annoyance level.

9. The method of claim 1, wherein the method further involves:
    tracking a device parameter during operation of the device; and using the device parameter to determine how to adjust the setting for the component.

10. The method of claim 1, wherein the acoustic annoyance model incorporates one or more of the following:
the hearing ability of a user;
a noise sensitivity of the user;
a general acoustic expectation of the user;
a specific acoustic expectation of the user;
level of activity for the device; and/or
an environmental factor such as an ambient temperature or an ambient noise level.

11. The method of claim 10, wherein the method further involves:
receiving a set of inputs from the user and parameters for the environment for the device; and
calibrating the acoustic annoyance model based on the received set of inputs and environmental parameters.

12. The method of claim 1, wherein aggregating the estimated acoustic noises for the noise-producing components further comprises:
receiving a description of an acoustic noise metric of interest for the device;
receiving an aggregation method table that describes how the to aggregate noise metrics of interest on a per-metric basis for multiple noise-producing components within the device; and
using the description of the acoustic noise metric and the aggregation method table to produce the aggregate estimate.

13. The method of claim 12, wherein the method further comprises:
using the acoustic characteristics to determine a predicted acoustic noise that will result from adjusting the setting for the component;
using the acoustic annoyance model and the aggregation method table to determine whether the predicted acoustic noise will increase an acoustic annoyance level associated with an objective sound metric and one or more sound quality metrics; and
changing the setting to ensure that the adjustment reduces the acoustic annoyance level;
wherein the sound quality metrics involve prominent discrete tones, beats, tonality, dissonance, roughness, sharpness, and dullness.

14. A non-transitory computer-readable storage medium storing instructions that when executed by a computer cause the computer to perform a method for reducing annoyance by managing the acoustic noise produced by a device, the method comprising:
determining an estimated acoustic noise produced by each noise-producing component of a plurality of noise-producing components within the device based on received acoustic characteristics for the plurality of noise-producing components within the device, wherein the acoustic characteristics comprises a predetermined respective acoustic transfer function for the component, wherein the acoustic transfer function returns an estimate of sound pressure value in decibels that would be produced by the noise-producing component based on an operating state of the noise-producing component, and wherein determining an estimated acoustic noise that would be produced by a respective noise-producing component comprises using the respective acoustic transfer function for the component, with the operating state of the noise-producing component as an input, to compute an estimated acoustic noise for each noise-producing component;
producing an aggregate estimate of the acoustic noise that would be produced by the device during operation by aggregating the estimated acoustic noises for the plurality of noise-producing components within the device;
determining whether the aggregate estimate exceeds a given acoustic annoyance level by analyzing the aggregate estimate using an acoustic annoyance model; and
adjusting a setting for a component within the device when the aggregate estimate exceeds the given acoustic annoyance level, to manage the acoustic noise produced by the device.

15. The non-transitory computer-readable storage medium of claim 14, wherein adjusting a setting for a component within the device when the aggregate estimate exceeds the given acoustic annoyance level comprises:
measuring a temperature within the device and determining whether adjusting the setting for the component within the device allows a thermal margin of the device to be met at the measured temperature; and
adjusting the setting for the component within the device when the aggregate estimate exceeds the given acoustic annoyance level and when it is determined that the adjusted setting allows the thermal margin to be met.

16. The non-transitory computer-readable storage medium of claim 14, wherein the respective acoustic transfer function returns one of a decibel constant for the input and a decibel result of an equation where the input is a variable for the equation.

17. The non-transitory computer-readable storage medium of claim 16, wherein the aggregate estimate is a sound pressure value in decibels and further wherein producing the aggregate estimate of the acoustic noise comprises:
using a system-total acoustic transfer function to sum the estimated sound pressure values for each noise-producing component.

18. The non-transitory computer-readable storage medium of claim 14,
wherein the acoustic annoyance model specifies an acoustic annoyance level that is associated with an undesirable sound quality and/or sound level for the acoustic noise produced by the device; and
wherein the undesirable sound quality and/or sound level can include one or more of the following:
steady-state acoustic noise levels;
short-term and/or long-term oscillations of acoustic noise levels;
steady-state sound qualities; and/or
changes in a sound quality.

19. The non-transitory computer-readable storage medium of claim 14,
wherein analyzing the aggregate estimate of the acoustic noise involves checking the aggregate estimate before, during, and/or after adjusting the setting; and
wherein the method further involves estimating an effect of adjusting the setting and compensating to ensure that the adjustment does not increase the estimated acoustic noise beyond the given acoustic annoyance level.

20. The non-transitory computer-readable storage medium of claim 14, wherein the method further involves:
tracking a device parameter during operation of the device; and using the device parameter to determine how to adjust the setting for the component.

21. The non-transitory computer-readable storage medium of claim 14, wherein the method further involves:
receiving a set of inputs from the user and parameters for the environment for the device; and
calibrating the acoustic annoyance model based on the received set of inputs and environmental parameters.

22. An apparatus that reduces annoyance by managing the acoustic noise produced by a device, comprising:

- an acoustic controller configured to estimate the acoustic noise produced by each noise-producing component of a plurality of noise-producing components within the device during operation based on acoustic characteristics, wherein the acoustic characteristics comprises a predetermined respective acoustic transfer function for the noise-producing component, wherein the respective acoustic transfer function returns an estimate of sound pressure value in decibels that would be produced by the noise-producing component based on an operating state of the noise-producing component, and wherein estimating the acoustic noise comprises using the transfer function for the component, with the operating state of the noise-producing component as an input, to compute an estimated acoustic noise for each component;
- wherein the acoustic controller is configured to aggregate the estimated acoustic noises for the plurality of noise-producing components within the device to produce an aggregate estimate of the acoustic noise that would be produced by the device; and
- wherein the acoustic controller is further configured to analyze the aggregate estimate using an acoustic annoyance model to facilitate minimizing the acoustic annoyance for the device.

23. The apparatus of claim 22, wherein the acoustic controller is further to adjust a setting for a component within the device based on the analysis of the aggregate estimate to minimize the acoustic annoyance for the device.

* * * * *